US011773310B2

(12) United States Patent
Alkhalaf et al.

(10) Patent No.: US 11,773,310 B2
(45) Date of Patent: Oct. 3, 2023

(54) ACCELERATED CEMENT COMPOSITION FOR REDUCING CORROSION OF WELLBORE CASINGS

(71) Applicant: Saudi Arabian Oil Company, Dhahran (SA)

(72) Inventors: Sara A. Alkhalaf, Alkhobar (SA); Abdullah S. Al-Yami, Dhahran (SA); Vikrant Wagle, Dhahran (SA); Mohammad Abdullah Al-Harthi, Taibah District (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/954,773

(22) Filed: Sep. 28, 2022

(65) Prior Publication Data
US 2023/0031885 A1    Feb. 2, 2023

Related U.S. Application Data

(62) Division of application No. 16/995,069, filed on Aug. 17, 2020, now Pat. No. 11,485,894.

(51) Int. Cl.
| *C09K 8/48* | (2006.01) |
| *C04B 14/30* | (2006.01) |
| *C04B 22/14* | (2006.01) |
| *C04B 24/12* | (2006.01) |
| *C04B 28/04* | (2006.01) |
| *E21B 33/14* | (2006.01) |
| *E21B 41/02* | (2006.01) |
| *C04B 103/12* | (2006.01) |

(52) U.S. Cl.
CPC .............. *C09K 8/48* (2013.01); *C04B 14/308* (2013.01); *C04B 22/148* (2013.01); *C04B 24/122* (2013.01); *C04B 28/04* (2013.01); *E21B 33/14* (2013.01); *E21B 41/02* (2013.01); *C04B 2103/12* (2013.01)

(58) Field of Classification Search
CPC ....... C09K 8/48; C04B 14/308; C04B 22/148; C04B 24/122; C04B 28/04; C04B 2103/12; E21B 33/14; E21B 41/02
See application file for complete search history.

(56) References Cited

U.S. PATENT DOCUMENTS

| 2,437,842 A | 3/1948 | Uhler |
| 2,761,843 A | 9/1956 | Brown |
| 4,012,264 A | 3/1977 | Murray et al. |
| 4,257,814 A | 3/1981 | Kellet et al. |
| 4,373,956 A | 2/1983 | Rosskopf |
| 4,481,037 A | 11/1984 | Beale et al. |
| 4,482,383 A | 11/1984 | Mckenzie |
| 4,493,771 A | 1/1985 | Wilson et al. |
| 4,515,708 A | 5/1985 | Haslegrave et al. |
| 4,976,316 A * | 12/1990 | Carpenter .............. C04B 28/02 166/291 |
| 5,057,467 A | 10/1991 | Croft |
| 5,450,900 A | 9/1995 | Schalla et al. |
| 5,641,385 A | 6/1997 | Croft et al. |
| 6,153,049 A | 11/2000 | Croft |
| 6,312,560 B1 | 11/2001 | Croft |
| 6,723,163 B1 | 4/2004 | Hofmann |
| 7,617,870 B1 | 11/2009 | Roddy |
| 7,863,228 B2 | 1/2011 | Loper et al. |
| 9,434,911 B2 | 9/2016 | Bennett et al. |
| 9,617,185 B2 | 4/2017 | Ferrari et al. |
| 9,617,461 B2 | 4/2017 | Nelson et al. |
| 9,850,419 B2 | 12/2017 | Ballew et al. |
| 10,144,860 B1 | 12/2018 | Reddy |
| 2003/0152479 A1 | 8/2003 | Heuer et al. |
| 2008/0289826 A1 | 11/2008 | Burts, Jr. et al. |
| 2009/0194283 A1 | 8/2009 | Ermel et al. |

(Continued)

FOREIGN PATENT DOCUMENTS

| CA | 794413 A | 9/1968 |
| CN | 106554765 A | 4/2017 |

(Continued)

OTHER PUBLICATIONS

Rihan et al., "The Effect of Two Amine-Based Corrosion Inhibitors in Improving the Corrosion Resistance of Carbon Steel in Sea Water" ASM International, JMEPEG vol. 23, pp. 693-699, 2014.
Houska, "Deicing Salt—Recognizing the Corrosion Threat," International Molybdenum Association (2009), available at: https://www.imoa.info/download_files/stainless-steel/DeicingSalt.pdf (last accessed Nov. 10, 2020).
U.S. Office Action dated Feb. 22, 2022 pertaining to U.S. Appl. No. 16/920,965, filed Jul. 6, 2020, 33 pages.

(Continued)

*Primary Examiner* — Crystal J. Lee

(74) *Attorney, Agent, or Firm* — DINSMORE & SHOHL LLP

(57) ABSTRACT

A method of reducing corrosion in tubular strings installed in wellbores includes dispensing an accelerated cement composition into a wellbore annulus, a casing-casing annulus, or both, the accelerated cement composition comprising a cement composition and an accelerant composition, where: the cement composition comprises a cement precursor and water; the accelerant composition comprises triethanolamine; and a concentration of the triethanolamine in the accelerated cement composition is greater than or equal to 10,000 parts per million by weight; allowing the accelerated cement composition to cure in the annulus to form a cured cement, where the triethanolamine reacts with a metal of the tubular string, the reaction forming a protective layer on the surfaces of the tubular string that inhibits dissolution of iron from the metal of the tubular string.

11 Claims, No Drawings

(56) References Cited

U.S. PATENT DOCUMENTS

| | | |
|---|---|---|
| 2009/0200029 A1 | 8/2009 | Roddy et al. |
| 2014/0190696 A1 | 7/2014 | Iverson et al. |
| 2015/0197033 A1 | 7/2015 | Agapiou et al. |
| 2016/0208158 A1 | 7/2016 | Monahan et al. |
| 2016/0264465 A1 | 9/2016 | Wibowo et al. |
| 2017/0210967 A1 | 7/2017 | Nelson et al. |
| 2019/0106952 A1 | 4/2019 | Shine, Jr. |
| 2019/0225542 A1 * | 7/2019 | Patil ................. C04B 14/10 |

FOREIGN PATENT DOCUMENTS

| | | | |
|---|---|---|---|
| CN | 105541158 B | 11/2017 | |
| EP | 3868730 A1 * | 8/2021 | ............ C04B 28/04 |
| WO | 2009103944 A1 | 8/2009 | |
| WO | 2017034547 A1 | 3/2017 | |
| WO | 2018144684 A1 | 8/2018 | |
| WO | 2019074830 A1 | 4/2019 | |

OTHER PUBLICATIONS

International Search Report and Written Opinion dated Jul. 1, 2021 pertaining to International application No. PCT/US2021/024401 filed Mar. 26, 2021, 17 pages.

International Search Report and Written Opinion dated May 12, 2021 pertaining to International application No. PCT/US2020/066340 filed Dec. 21, 2020, 16 pgs.

International Search Report and Written Opinion dated Mar. 25, 2021 pertaining to International application No. PCT/US2020/063992 filed Dec. 9, 2020, 17 pgs.

* cited by examiner

ACCELERATED CEMENT COMPOSITION FOR REDUCING CORROSION OF WELLBORE CASINGS

CROSS-REFERENCE TO RELATED APPLICATION

The present application is a division of co-pending U.S. patent application Ser. No. 16/995,069, filed Aug. 17, 2020, and entitled "ACCELERATED CEMENT COMPOSITIONS AND METHODS FOR TOP-JOB CEMENTING OF A WELLBORE TO REDUCE CORROSION," the entire contents of which are incorporated by reference into the present disclosure.

TECHNICAL FIELD

Embodiments of the present disclosure generally relate to natural resource well drilling and, more specifically, to accelerated cement compositions and methods for top job cementing of wellbores to reduce corrosion.

BACKGROUND

Extracting subterranean hydrocarbon sources may require drilling a hole from the surface to the subterranean geological formation housing the hydrocarbons. Specialized drilling techniques and materials are utilized to form the wellbore hole and extract the hydrocarbons. Specialized materials utilized in drilling operations include materials for sealing the casing-casing annulus between two tubular strings installed in the wellbore. Such specialized materials may also be formulated for specific downhole conditions.

A wellbore is a hole that extends from the surface to a location beneath the surface to permit access to hydrocarbon-bearing subterranean formations. The wellbore contains at least a portion of a fluid conduit that links the interior of the wellbore to the surface. The fluid conduit coupling the interior of the wellbore to the surface may be capable of permitting regulated fluid flow from the interior of the wellbore to the surface. The fluid conduit may also permit access between equipment on the surface and the interior of the wellbore. The fluid conduit may be defined by one or more tubular strings, such as wellbore casings for example, inserted into the wellbore and secured in the wellbore.

When positioning a tubular string or a portion of a tubular string in the wellbore, the exterior surfaces of the tubular string and the wellbore wall form and define a wellbore annulus. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material, such as cement, in the wellbore annulus or the casing-casing annulus to seal the annulus.

Primary cementing refers to the process of initially sealing the annulus upon installation of the casing or other tubular string. Primary cementing may refer to initial sealing of the annulus between the exterior surface of the tubular string and the wellbore wall of the wellbore or initial sealing of a casing-casing annulus. Primary cementing forms a protective solid sheath around the exterior surface of the tubular string.

Primary cementing in conventional wellbore installations may be performed with wellbore cement. With any primary cementing, there is the risk that incomplete cementing may occur, and therefore remedial cementing, which may be commonly referred to as "top job cementing," may be required to prevent the well integrity from being compromised during the well's lifetime and to support and protect the casing from corrosion. When incomplete cementing is observed by the lack of cement at the surface, due either to partial cementing of the annulus or fallback from surface, top job cementing is required to protect the casing and provide mechanical integrity to the wellbore. A lack of top job cementing may cause delays in drilling, unproductive wait times, and expensive remedial work. Conventional cement compositions for top job cementing include calcium chloride ($CaCl_2$) or other salts as accelerants to increase the cure rate of the cement composition.

SUMMARY

As discussed above, top job cementing plays a key role for well integrity, as well as supporting and protecting the casings from corrosion. Conventional procedures for top job cementing often use cement compositions that include $CaCl_2$ or other salts as an accelerator to increase the cure rate and reduce the setting time of cement. However, these conventional cement compositions comprising $CaCl_2$ or other salt may increase the rate of corrosion of the tubular strings or other metal components of the wellbore, which can decrease the lifespan of the wellbore or require costly repairs and maintenance.

Accordingly, ongoing needs exist for accelerated cement compositions and methods for top job cementing to reduce corrosion in the tubular strings and other metal components of the wellbore. These needs are met by embodiments of the accelerated cement compositions and methods of the present disclosure for top cementing of a wellbore to reduce corrosion in tubular strings installed in wellbores. The present disclosure is directed to accelerated cement compositions for top job cementing that include an accelerant composition comprising triethanolamine (TEA). The TEA may be present in amounts greater than or equal 10,000 parts per million by weight based on the total weight of the accelerated cement composition. The TEA may act as an accelerant to increase the cure rate of the accelerated cement composition while at the same time providing corrosion inhibiting properties to the accelerated cement composition. The method of the present disclosure for top job cementing of a wellbore may include preparing the accelerated cement composition comprising the TEA and injecting the accelerated cement composition into the top opening of the annulus, such as the top opening of the wellbore annulus or casing-casing annulus. The method may further include allowing the accelerated cement composition to cure to form a hardened cement. This accelerated cement compositions and methods of the present disclosure may allow for efficient top job cementing of a wellbore while at the same time reducing or preventing corrosion of the tubular strings and other metal components of the wellbore.

According to aspects of the present disclosure, a method of reducing corrosion in tubular strings installed in wellbores may include dispensing an accelerated cement composition into a wellbore annulus, a casing-casing annulus, or both, where the accelerated cement composition may include a cement composition and an accelerant composition. The cement composition may include a cement precursor and water, and the accelerant composition may include triethanolamine. A concentration of the triethanolamine in the accelerated cement composition may be greater than or equal to 10,000 parts per million by weight. The method may further include allowing the accelerated cement composition to cure in the annulus to form a cured cement, where the triethanolamine may react with a metal of the tubular string, the reaction forming a protective layer on the surfaces of the tubular string that may inhibit dissolution of iron from the metal of the tubular string.

According to other aspects of the present disclosure, a method of reducing corrosion in tubular strings installed in wellbores may include injecting a cement composition into a wellbore annulus, a casing-casing annulus, or both, for primary cementing, where primary cementing may result in incomplete cementing of the wellbore annulus, the casing-casing annulus, or both. The method may further include injecting an accelerated cement composition into a top opening of the wellbore annulus, the casing-casing annulus, or both, where the accelerated cement composition may include the cement composition and an accelerant composition. The cement composition may include a cement precursor and water, and the accelerant composition may include triethanolamine. A concentration of the triethanolamine in the accelerated cement composition may be greater than or equal to 10,000 parts per million by weight. The method may further include allowing the accelerated cement composition to cure in the annulus to form a cured cement, where the triethanolamine may react with a metal of the tubular string, the reaction forming a protective layer on the surfaces of the tubular string that may inhibit dissolution of iron from the metal of the tubular string.

According to other aspects of the present disclosure, an accelerated cement composition for reducing corrosion of wellbore casings may include a cement composition comprising: from 10 wt. % to 70 wt. % cement precursor based on the total weight of the cement composition; and from 5 wt. % to 70 wt. % water based on the total weight of the cement composition; and an accelerant composition comprising triethanolamine, where the accelerated cement composition may have a concentration of triethanolamine greater than or equal to 10,000 parts per million by weight.

Additional features and advantages of the described embodiments will be set forth in the detailed description, which follows, and in part will be readily apparent to those skilled in the art from that description or recognized by practicing the described embodiments, including the detailed description, which follows as well as the drawings and the claims.

DETAILED DESCRIPTION

The present disclosure is directed to accelerated cement compositions and methods for top job cementing to reduce corrosion in tubular strings installed in wellbores. The method of the present disclosure for reducing corrosion in tubular strings installed in wellbores may include dispensing an accelerated cement composition into a wellbore annulus, a casing-casing annulus, or both. The accelerated cement composition may comprise a cement composition and an accelerant composition. The cement composition may include a cement precursor and water. The accelerant composition may include triethanolamine. A concentration of the triethanolamine in the accelerated cement composition may be greater than or equal to 10,000 parts per million by weight. The method of present disclosure may include allowing the accelerated cement composition to cure in the annulus to form a cured cement, where the triethanolamine reacts with a metal of the tubular string, the reaction forming a protective layer on the surfaces of the tubular string that inhibits dissolution of iron from the metal of the tubular string. In embodiments, the cement composition and accelerant composition may each be injected separately into the annulus and mixed in the annulus to produce the accelerated cement composition.

The accelerated cement compositions of the present disclosure for reducing corrosion of wellbore casings may include a cement composition and an accelerant composition. The cement composition may include from 10 wt. % to 70 wt. % cement precursor based on the total weight of the cement composition, and from 5 wt. % to 70 wt. % water based on the total weight of the cement composition. The accelerant composition may include triethanolamine. The accelerated cement composition may include a concentration of triethanolamine greater than or equal to 10,000 parts per million by weight. The methods and accelerated cement compositions may reduce corrosion in tubular string in wellbores by incorporating triethanolamine into the accelerant composition. The accelerate composition may accelerate the setting time of cement in top job cementing processes, compared to conventional top job cementing process. These and other advantages and benefits of systems and processes will be subsequently discussed in this disclosure.

As used throughout this disclosure, the term "hydrocarbon-bearing formation" may refer to a subterranean geologic region containing hydrocarbons, such as crude oil, hydrocarbon gases, or both, which may be extracted from the subterranean geologic region. The terms "subterranean formation" or just "formation" may refer to a subterranean geologic region that contains hydrocarbons or a subterranean geologic region proximate to a hydrocarbon-bearing formation, such as a subterranean geologic region to be treated for purposes of enhanced oil recovery or reduction of water production.

As used throughout this disclosure, the term "fluid" may include liquids, gases, or both.

As used throughout the present disclosure, the term "spacer fluid" may refer to a fluid utilized to maintain separation between any two other materials utilized in well production, such as fluids that may be incompatible with each other, for example.

As used throughout the present disclosure, the term "displacement fluid" may refer to a fluid injected into the wellbore to displace a different fluid out of the wellbore and into the annulus or into a portion of the subterranean formation.

As used throughout the present disclosure, the term "cement precursor" may refer to any suitable material which, when mixed with water, may be cured into a cement. A cement precursor may be hydraulic or non-hydraulic.

As used throughout this disclosure, the term "cure" or "curing" refers to providing adequate moisture, temperature and time to allow a cement or concrete to achieve the desired properties (such as hardness) for its intended use through one or more reactions between the water and the cement precursor.

As used throughout the present disclosure, the term "annulus" may refer to the volume defined between the exterior surface of a tubular string and the wellbore wall or an inner surface of another tubular string that surrounds to the tubular string. The term "annulus" may refer to the wellbore annulus, a casing-casing annulus, or both.

As used throughout the present disclosure, the term "top opening," when used in conjunction with the annulus, may refer to the annular opening at the surface.

As used throughout the present disclosure, the term "by weight of cement" may refer to an amount of a constituent of the accelerated cement composition relative to the amount of the cement precursor in the accelerated cement composition and can be calculated by dividing the weight of the constituent by the total weight of the cement precursor in the accelerated cement composition. "By weight of cement" may be abbreviated using the acronym BWOC.

As used throughout the present disclosure, the term "substantially free" of a constituent in the composition means that the cement composition includes less than 0.1% BWOC of that constituent. When used outside the context of the cement composition, the term "substantially free" of a constituent refers less than 0.1 weight percent (wt. %) of that component in a composition. For example, accelerant composition that is substantially free of aluminum sulphate may have less than 0.1 wt. % aluminum sulphate based on the total weight of the accelerant composition.

The wellbore forms a pathway capable of permitting both fluids and apparatus to traverse between the surface and the hydrocarbon-bearing formation. Besides defining the void volume of the wellbore, the wellbore wall also acts as an interface through which fluid can transition between the subterranean formation and the interior of the well bore. The wellbore wall can be unlined (that is, bare rock or formation) to permit such interaction with the formation or lined, such as by a tubular string, so as to prevent such interactions.

The wellbore may include at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. Example equipment connected at the surface to the fluid conduit includes pipelines, tanks, pumps, compressors, and flares. The fluid conduit may be large enough to permit introduction and removal of mechanical devices, including but not limited to tools, drill strings, sensors, and instruments, into and out of the interior of the wellbore.

The fluid conduit may be defined by a tubular string installed in the wellbore. The wellbore annulus has a volume defined between the external surface of the tubular string and the wellbore wall. As wellbore drilling continues and the wellbore extends deeper into the subterranean formation, one or more additional tubular strings may be installed within the fluid conduit defined by the initial tubular string. Additional tubular strings may have outer cross-sectional dimensions that are less than the inner cross-sectional dimensions of the tubular strings within which the additional tubular strings are disposed. The additional tubular string, when installed in the wellbore, may form a casing-casing annulus defined between the exterior surface of the additional tubular string and the interior surface of the tubular string surrounding the additional tubular string. After drilling is complete and the wellbore is fitted with production tubing for production, the wellbore may comprise a plurality of tubular strings of progressively smaller cross-sectional dimensions that define a wellbore annulus and a plurality of casing-casing annuli.

Installing each tubular string may include positioning the tubular string in the wellbore and primary cementing the tubular string in the wellbore. The primary cementing process may include placing the cement composition in the annulus and curing the cement composition to seal the annulus. Primary cementing may anchor and support the tubular string in the wellbore and may protect the tubular string from corrosion caused by fluids from the hydrocarbon-containing formation. Primary cementing may also provide a hydraulic seal in the annulus that may prevent migration of gases and liquids from one side of the hydraulic seal to the other. This hydraulic seal may prevent fluid communication between production zones in the wellbore, referred to as zonal isolation, or may prevent migration of fluids to the surface. Before primary cementing can be performed, the wellbore may be drilled using a drill string in the presence of a drilling fluid. At the conclusion of drilling, the wellbore may contain the drilling fluid. With the drilling fluid left in the wellbore, the tubular string may be positioned in the wellbore. When the tubular string is positioned in the wellbore, the drilling fluid may occupy the interior volume of the tubular string as well as the annulus between the exterior surface of the tubular string and the wellbore wall. For interior tubular strings, the tubular string may form a wellbore annulus between the exterior surface and the wellbore wall along part of the length of the tubular string and a casing-casing annulus between the exterior surface and an interior surface of the previously installed casing along an uphole part of the length of the tubular string.

As previously discussed, with any primary cementing, there is the risk that incomplete cementing may occur, and, therefore, top job cementing may be needed to complete primary cementing to reduce or prevent the well integrity from being compromised during the well's lifetime and to support and protect the tubular strings. When incomplete primary cementing occurs, which can be observed by the lack of cement at the surface, due either to partial cementing of the annulus or fallback from surface, top job cementing may be employed to finish primary cementing the wellbore. A lack of top job cementing may cause delays in drilling, unproductive wait times, and expensive remedial work.

Top job cementing may include dispensing, squeezing, or injecting a cement composition into the annulus, such as the wellbore annulus, casing-casing annulus, or both, from the top opening of the annulus. Conventional procedures for top job cementing often use cement compositions that include $CaCl_2$ or other type of salt as an accelerator to increase the cure rate and reduce the setting time of cement. However, these conventional cement compositions that include $CaCl_2$ or other salts may have an adverse effect on corrosion of the tubular strings and other metal components over time. The increased corrosion caused by $CaCl_2$ and other salts may reduce the lifetime of the wellbore and may cause delays to replace or repair corroded tubular strings and other metal equipment.

As previously discussed, the present disclosure is directed to accelerated cement compositions comprising a cement composition and an accelerant composition comprising triethanolamine (TEA). The accelerant composition comprising TEA may be substantially free of $CaCl_2$ or salts and may provide anti-corrosion properties to the accelerated cement compositions. The present disclosure is also directed to methods of top job cementing tubular strings while reducing corrosion. These methods may include injecting the accelerated cement composition comprising the TEA into the top opening of the annulus and allowing the accelerated cement composition to cure. The methods and accelerated cement composition of the present disclosure may reduce corrosion in tubular string while reducing the setting time of cement.

The method of the present disclosure for top job cementing a wellbore while reducing corrosion in tubular strings installed in wellbores may include dispensing an accelerated cement composition into the top opening of the wellbore annulus, the casing-casing annulus, or both. The accelerated cement composition may include the cement composition and the accelerant composition. The cement composition may include a cement precursor and water. The accelerant composition may include triethanolamine. A concentration of the triethanolamine in the accelerated cement composition may be greater than or equal to 10,000 parts per million by weight based on the total weight of the accelerated cement composition. The method may further include allowing the accelerated cement composition to cure in the annulus to form a cured cement. The triethanolamine may react with a metal of the tubular string, the reaction forming a protective layer on the surfaces of the tubular string that inhibits dissolution of iron from the metal of the tubular string or other metal component. The protective layer formed by the triethanolamine may reduce or prevent corrosion of the tubular string and other metal components.

Prior to dispensing the accelerated cement composition into the wellbore annulus, the casing-casing annulus, or both, the accelerant composition may be contacted and mixed with the cement composition to produce the accelerated cement composition. The accelerated cement composition may be mixed and then injected, squeezed, or pumped into the top opening of the wellbore annulus, the casing-casing annulus, or both. In embodiments, contacting the accelerant composition with the cement composition may include injecting the accelerant composition into the top opening of the wellbore annulus, the casing-casing annulus, or both, and then injecting the cement composition into the wellbore annulus, the casing-casing annulus, or both, after injecting the accelerant composition. The cement composition may mix with the accelerant composition in the annulus to form the accelerated cement composition having an increased curing rate.

In embodiments, contacting the accelerant composition with the cement composition may include preparing the cement composition, adding the accelerant composition to the cement composition to produce an accelerated cement composition, and mixing the accelerated cement composition. The accelerated cement composition may be mixed for a period of time sufficient to produce a homogeneous mixture. In some embodiments, the accelerated cement composition may be mixed for a period of from 10 minutes to 50 minutes, or about 30 minutes.

Prior to top job cementing by dispensing the accelerated cement composition into the top portion of the wellbore annulus, the casing-casing annulus, or both, the method may include drilling the wellbore, placing the tubular string in the wellbore, or both, and then primary cementing the annulus. During primary cementing, the cement composition may be pumped down the fluid conduit defined by the interior surface of the tubular string and a displacement fluid may be pumped in after the cement composition to force the cement composition up into the annulus. The primary cement composition may flow upwards through the annulus and may displace other fluids previously present in the annulus, such as drilling fluids or other fluids. When incomplete primary cement occurs, as indicated by the primary cement composition failing to reach the top opening of the annulus at the surface, some of these drilling fluids or other fluids may remain in the annulus between the primary cement and the top opening of the annulus. In some embodiments, the accelerated cement composition may include one or more constituents that may be at least partially incompatible with drilling fluids or other treatment fluids present in the annulus following incomplete primary cementing. When the accelerated cement composition includes constituents incompatible with drilling fluids or treatment fluids already present in the annulus, the method may further include injecting a spacer fluid into the top opening of the wellbore annulus, casing-casing annulus, or both, before injecting accelerated cement composition into the wellbore annulus, casing-casing annulus, or both. The spacer fluid may provide a buffer between the drilling fluid or treatment fluid and the accelerated cement composition to prevent contact between incompatible constituents.

Prior to dispensing the accelerated cement composition into the wellbore annulus, the casing-casing annulus, or both, the method may include an initial primary cementing in which a cement composition is pumped into the fluid conduit of the wellbore followed by a displacement fluid that displaces the cement in the fluid conduit up into a wellbore annulus, a casing-casing annulus, or both, in a bottom up process. Incomplete may occur during this initial primary cementing and may be identified by observing a lack of appearance of the cement composition at the top opening of the annulus. Incomplete primary cementing may be the result of an intentional application of a two-step cementing process. Incomplete primary cementing may also result from fallback of the cement composition during primary cementing. Fallback can occur when the pressure of the cement composition in the annulus during primary cementing is greater than a fracture initiation pressure of the formation, which can cause fracture of the formation. Fracture can increase pore size in the formation to the point that flowable materials, such as uncured cement, from the annulus flow into the formation, resulting in fluid loss. The cement lost to the formation may cause the cement in the annulus to fallback or receded from the top opening, leaving a portion of the annulus proximate the top opening to be uncemented.

To complete primary cementing, the accelerated cement composition may be pumped or dispensed into the top opening of the annulus at the surface of the wellbore. The accelerated cement composition may be pumped into the top opening of the annulus until the remaining portions of the annulus (wellbore annulus, a casing-casing annulus, or both) are filled with the accelerated cement composition, which can be identified by a condition in which additional accelerated cement composition can no longer be pumped, squeezed, or injected into the annulus. After dispensing, squeezing, or injecting the accelerated cement composition into the wellbore annulus, the casing-casing annulus, or both, the accelerated cement composition may be allowed to cure in the annulus to form a cured cement. The triethanolamine included in the accelerant composition may react with a metal of the tubular string to form a protective layer on the surfaces of the tubular string. The protective layer may inhibit dissolution of iron from the metal of the tubular string.

As previously discussed, the accelerated cement composition includes a cement composition that may include at least a cement precursor and water. The cement composition may further include one or more of silica sand, silica flour, weighting agents, cement retarders, defoamers, or combinations of these. The cement composition may also include one or more additives, such as but not limited to, one or more expansion additives, friction reducers, gas block stabilizers, dispersants, surfactants, latex, latex stabilizers, epoxy resins, epoxy curing agents, or combinations of these. Other constituents known in the art of primary cementing may also be incorporated into the cement composition.

The cement precursor may be any suitable material which, when mixed with water, can be cured into a cement. The cement precursor may include hydraulic or non-hydraulic cement precursors. A hydraulic cement precursor may include a mixture of limestone, clay and gypsum burned together at temperatures greater than 1000 degrees Celsius (° C.). Cement compositions prepared with hydraulic cement precursors may harden instantly or within a few minutes when contacted with water. A non-hydraulic cement precursor may include mixtures of lime, gypsum, plasters, and oxychloride. Cement compositions prepared with non-hydraulic cement precursors may take longer to harden or may require drying conditions for proper strengthening, but may be more economically feasible. The cement precursor may include one or more classes of cement precursors identified by the American Petroleum Institute (API), such as an API Class G cement. The cement precursor may be a Portland cement precursor, such as but not limited to a Class G Portland cement. Portland cement is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter-ground addition. The cement precursor may also include a Saudi Class G cement precursor, which may include a mixture of Portland cement and crystalline silica, which may be referred to in the alternative as quartz.

The cement precursor may include one or more of calcium hydroxide, silicates, oxides, belite ($Ca_2SiO_4$), alite ($Ca_3SiO_5$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$), sodium oxide, potassium oxide, limestone, lime (calcium oxide), hexavalent chromium, trivalent chromium, calcium aluminate, or combinations of these. The cement precursor material may include Portland cement, siliceous fly ash, calcareous fly ash, slag cement, silica fume, quartz, other cement precursor material, or any combination of these.

The cement composition may include Saudi Class G cement. Saudi Class G cement may include from 60 wt. % to 100 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 70 wt. % to 100 wt. %, from 70 wt. % to 99 wt. %, from 70 wt. % to 97 wt. %, from 70 wt. % to 95 wt. %, from 70 wt. % to 90 wt. %, from 70 wt. % to 80 wt. %, from 80 wt. % to 100 wt. %, from 80 wt. % to 99 wt. %, from 80 wt. % to 97 wt. %, from 80 wt. % to 95 wt. %, from 80 wt. % to 90 wt. %, from 90 wt. % to 100 wt. %, from 90 wt. % to 99 wt. %, from 90 wt. % to 97 wt. %, from 90 wt. % to 95 wt. %, from 95 wt. % to 100 wt. %, or from 95 wt. % to 99 wt. % Portland cement based on the total weight of the Saudi Class G cement precursor. Saudi Class G cement precursor may include less than 40 wt. %, less than 30 wt. %, less than 20 wt. %, less than 10 wt. %, less than 5 wt. %, less than 3 wt. %, or even less than 1 wt. % crystalline silica, or quartz based on the total weight of the Saudi Class G cement precursor. Saudi Class G cement precursor may have a pH greater than 7, such as from 8 to 14, from 10 to 13, from 11 to 13, from 12 to 13, or 12.4. Saudi Class G cement may have a bulk density at 20° C. of from 70 pounds per cubic foot ($lb/ft^3$) (1121 kilograms per cubic meter ($kg/m^3$), where 1 $lb/ft^3$ equals 16.0185 $kg/m^3$) to 120 $lb/ft^3$ (1922 $kg/m^3$), from 80 $lb/ft^3$ (1281 $kg/m^3$) to 110 $lb/ft^3$ (1762 $kg/m^3$), or from 90 $lb/ft^3$ (1442 $kg/m^3$) to 100 $lb/ft^3$ (1602 $kg/m^3$), or 94 $lb/ft^3$ (1506 $kg/m^3$). Saudi Class G cement precursor may have a solubility in water of from 0.1 grams per 100 milliliters (g/100 ml) to 2 g/100 ml, from 0.1 g/100 ml to 1 g/100 ml, from 0.1 g/100 ml to 0.8 g/100 ml, from 0.1 g/100 ml to 0.5 g/100 ml, from 0.2 g/100 ml to 2 g/100 ml, from 0.2 g/100 ml to 1 g/100 ml, from 0.2 g/100 ml to 0.8 g/100 ml, from 0.2 g/100 ml to 0.5 g/100 ml, from 0.5 g/100 ml to 2 g/100 ml, from 0.5 g/100 ml to 1 g/100 ml, from 0.5 g/ml to 0.8 g/100 ml, or 0.5 g/100 ml.

The cement composition, the accelerated cement composition, or both, may include an amount of cement precursor sufficient to produce a hard rigid cement upon curing. The cement composition, the accelerated cement composition, or both, may include greater than or equal to 10 wt. %, greater than or equal to 20 wt. %, greater than or equal to 30 wt. %, or greater than or equal to 50 wt. % cement precursor based on the total weight of the cement composition. The cement composition, the accelerated cement composition, or both, may include less than or equal to 80 wt. %, less than or equal to 70 wt. %, or even less than or equal to 60 wt. % cement precursor based on the total weight of the cement composition. The cement composition, the accelerated cement composition, or both, may include from 10 wt. % to 80 wt. %, from 10 wt. % to 70 wt. %, from 10 wt. % to 60 wt. %, from 10 wt. % to 50 wt. %, from 20 wt. % to 80 wt. %, from 20 wt. % to 70 wt. %, from 20 wt. % to 60 wt. %, from 20 wt. % to 50 wt. %, from 30 wt. % to 80 wt. %, from 30 wt. % to 70 wt. %, from 30 wt. % to 60 wt. %, from 30 wt. % to 50 wt. %, from 50 wt. % to 80 wt. %, from 50 wt. % to 70 wt. %, or from 50 wt. % to 60 wt. % cement precursor based on the total weight of the cement composition. In embodiments, the cement composition, the accelerated cement composition, or both, may include from 80 wt. % to 90 wt. % cement precursor based on the total weight of the cement composition.

Water may be added to the cement precursor and other constituents to produce the cement composition. The water in the cement composition may include distilled water, deionized water, filtered water, or tap water. The water used to produce the cement composition may be in the form of an aqueous solution containing additives or contaminants. The water may include freshwater or seawater, natural or synthetic brine, salt water, municipal water, well water, formation water, produced water, brackish water, or combinations of these. Salts or other organic compounds may be incorporated into the water to control certain properties of the water, and thus control properties of the cement composition, such as density. Suitable salts may include, but are not limited to, alkali metal chlorides, hydroxides, or carboxylates. In embodiments, salts present in the water may include, but are not limited to, sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these. The water may be substantially free of salts, such as having less than 1 wt. % salts based on the total weight of the water. The water may have less than 0.1 wt. % or even less than 0.01 wt. % salts based on the total weight of the water.

The cement composition, the accelerated cement composition, or both, may include an amount of water sufficient to allow the cement composition to be pumpable and to cause curing of the cement composition. The cement composition, the accelerated cement composition, or both, may have greater than or equal 5 wt. %, greater than or equal to 10 wt. %, or greater than or equal 15 wt. % water based on the total weight of the cement composition. The cement composition, the accelerated cement composition, or both, may include less than or equal to 70 wt. %, less than or equal to 60 wt. %, less than or equal to 50 wt. %, or even less than or equal to 40 wt. % water based on the total weight of the cement composition. The cement composition, the accelerated cement composition, or both, may include from 5 wt. % to 70 wt. %, from 5 wt. % to 60 wt. %, from 5 wt. % to 50 wt. %, from 5 wt. % to 40 wt. %, from 5 wt. % to 20 wt. %, from 10 wt. % to 70 wt. %, from 10 wt. % to 60 wt. %, from 10 wt. % to 50 wt. %, from 10 wt. % to 40 wt. %, from 15 wt. % to 70 wt. %, from 15 wt. % to 60 wt. %, from 15 wt. % to 50 wt. %, or from 15 wt. % to 40 wt. % water based on the total weight of the cement composition.

As previously discussed, the cement composition may include silica sand, silica flour, weighting agents, surfactants, cement retarders, defoamers, or combinations of these. Silica sand, silica flour, or both, may be included in the cement composition as strength stabilizing agents. Silica sand, silica flour, or both, may be used to stabilize the strength and permeability of the cement composition at downhole temperatures between 230° F. and 700° F. (110° C. and 371° C.), prevent strength retrogression, and decrease the permeability of the cured cement. Silica sand may include any naturally occurring or man-made silica sand. The silica sand may have an average particle size of from 100 micrometers ($\mu m$) (microns) to 200 $\mu m$, from 100 $\mu m$ to 180 $\mu m$, from 100 $\mu m$ to 175 $\mu m$, from 150 $\mu m$ to 200 $\mu m$, from 150 $\mu m$ to 180 $\mu m$, from 150 $\mu m$ to 175 $\mu m$, from 175 $\mu m$ to 200 $\mu m$, or from 180 $\mu m$ to 200 $\mu m$. The cement composition, the accelerated cement composition, or both, may include from 0% BWOC to 50% BWOC silica sand, from 0% BWOC to 20% BWOC, from 0% BWOC to 10%, BWOC, from 1% BWOC to 50% BWOC, from 1% BWOC to 20% BWOC, from 1% BWOC to 10% BWOC, from 10% BWOC to 50% BWOC, or from 10% to 20% BWOC silica sand. In embodiments, the cement composition, the accelerated cement composition, or both, may not include silica sand or may be substantially free of silica sand, such as having less than 1% BWOC silica sand. The cement composition, the accelerated cement composition, or both, may have less than 0.1% BWOC or even less than 0.01% BWOC silica sand.

The silica flour may be any naturally occurring or man-made silica flour. The silica flour may have an average particle size less than the silica sand. The silica flour may have an average particle size less than 100 $\mu m$, less than or equal to 75 $\mu m$, less than or equal to 50 $\mu m$, less than or equal to 25 $\mu m$, less than or equal to 15 $\mu m$, or even less than or equal to 10 $\mu m$. The silica flour may have an average particle size of from 1 $\mu m$ to less than 100 $\mu m$, from 1 $\mu m$ to 75 $\mu m$, from 1 $\mu m$ to 50 $\mu m$, from 1 $\mu m$ to 25 $\mu m$, from 1 $\mu m$ to 15 $\mu m$, from 5 $\mu m$ to less than 100 $\mu m$, from 5 $\mu m$ to 75 $\mu m$, from 5 $\mu m$ to 50 $\mu m$, from 5 $\mu m$ to 25 $\mu m$, or from 5 $\mu m$ to 15 $\mu m$. The cement composition, the accelerated cement composition, or both, may include from greater than 0% BWOC to 50% BWOC, from greater than 0% BWOC to 40% BWOC, from greater than 0% BWOC to 30% BWOC, from greater than 0% BWOC to 20% BWOC, from 1% BWOC to 50% BWOC, from 1% BWOC to 40% BWOC, from 1% BWOC to 30% BWOC, from 1% BWOC to 20% BWOC, from 5% BWOC to 50% BWOC, from 5% BWOC to 40% BWOC, from 5% BWOC to 30% BWOC, from 5% BWOC to 20% BWOC silica flour. In embodiments, the cement composition, the accelerated cement composition, or both, may not include silica flour or may be substantially free of silica flour, such as having less than 1% BWOC silica flour, less than 0.1% BWOC, or even less than 0.01% BWOC silica flour. The silica flour may be used in combination with silica sand to formulate the cement composition with a density of from 130 lb/ft$^3$ (2082 kg/m$^3$) to 165 lb/ft$^3$ (2643 kg/m$^3$), which may provide for resistance of gas migration problems through the cured cement. The combination of the silica sand and silica flour may increase the solids packing density of the cement composition, the accelerated cement composition, or both, and thus reduce the permeability of the cured cement to gas flow, among other features.

As previously discussed, the cement composition may include a weighting agent, which may also be referred to as a "weighting material" or "weight material." The weighting agent may include particulate solids having a specific gravity (SG) that may operate to increase the density of the cement slurry. Examples of weighting agents may include, but are not limited to, sand, barite (barium sulfate), hematite, calcium carbonate, siderite, ilmenite, silica sand, manganese oxide (MnO), hausmanite (manganese tetroxide ($Mn_3O_4$)), zinc oxide, zirconium oxide, iron oxide, fly ash, or any combination of these weighting agents. The cement composition may include one weighting agent or a combination of two or more different weighting agents, each with different properties. The weighting agents can be obtained from any readily available source. The weighting agent may have a specific gravity (SG) of from 2 to 6, from 2 to 5, from 3 to 6, or from 3 to 5. The weighting agents may have a mean particle size distribution of from 0.1 $\mu m$ to 50 $\mu m$, or from 0.1 $\mu m$ to 40 $\mu m$, from 0.1 $\mu m$ to 30 $\mu m$, from 0.1 $\mu m$ to 20 $\mu m$, from 0.1 $\mu m$ to 10 $\mu m$, from 10 $\mu m$ to 50 $\mu m$, from 10 $\mu m$ to 40 $\mu m$, from 10 $\mu m$ to 30 $\mu m$, from 10 $\mu m$ to 20 $\mu m$, from 20 $\mu m$ to 50 $\mu m$, from 20 $\mu m$ to 40 $\mu m$, from 20 $\mu m$ to 30 $\mu m$, from 30 $\mu m$ to 50 $\mu m$, from 30 $\mu m$ to 40 $\mu m$, or from 40 $\mu m$ to 50 $\mu m$. The cement composition, the accelerated cement composition, or both, may include from 10% BWOC to 150% BWOC, from 10% BWOC to 125% BWOC, from 10% BWOC to 100%, from 10% BWOC to 75% BWOC, from 10% BWOC to 50% BWOC, from 20% BWOC to 150% BWOC, from 20% BWOC to 125% BWOC, from 20% BWOC to 100% BWOC, from 20% BWOC to 75% BWOC, from 20% BWOC to 50% BWOC, from 50% BWOC to 150% BWOC, from 50% BWOC to 125% BWOC, from 50% BWOC to 100% BWOC, from 50% BWOC to 75% BWOC, from 75% BWOC to 150% BWOC, or from 100% BWOC to 150% BWOC weighting agent. In embodiments, the cement composition, the accelerated cement composition, or both, may not include weighting agents or may be substantially free of weighting agents, such as having less than 1% BWOC, less than 0.1% BWOC, or even less than 0.01% BWOC weighting agents.

The addition of one or more of these components (the silica sand, silica flour, weighting agent) to the cement composition may reduce settling in the cement composition. In embodiments, the inclusion of one or more of the silica sand, silica flour, weighting agent, or combinations of these may reduce the porosity of the cement composition by including different particles size distributions of particles and components.

The cement composition, the accelerated cement composition, or both, may include from 0.1% BWOC to 10% BWOC surfactant. In embodiments, the cement composition, the accelerated cement composition, or both may not include a surfactant. The cement composition, the accelerated cement composition, or both, may include a cement retarder to adjust or slow down the curing rate of the accelerated cement composition. Examples of retarders may include but are not limited to lignin, gums, starches, lignosulphonate derivatives, or combinations of these. In embodiments, the accelerated cement composition may not include a cement retarder. The cement composition may include one or a plurality of defoamers. The defoamers, or "anti-foam additives," may be added to the cement composition to prevent frothing, foaming, and vapor entrapment that may occur during the mixing process of a cement slurry. The cement composition, the accelerated cement composition, or both, may include less than 5 gps defoamer, where gps refers to U.S. gallons per sack of cement precursor. The cement composition, the accelerated cement composition, or both, may include less than or equal to 1 gps defoamer, or even less than or equal to 0.5 gps defoamer. In embodiments, the cement composition, accelerated cement composition, or both, may not include a defoamer or may be substantially free of defoamers, such as having less than or equal to 1% BWOC, less 0.1% BWOC, or even less than 0.01% BWOC defoamer.

The cement composition may include additives, such as but not limited to, expansion additives, dispersants, fluid loss additives, friction reducers, gas block stabilizers, other additives, or combinations of these. The cement composition may include an expansion additive. The expansion additive can be selected from known expansion additive compounds. Examples of expansion additives may include metal oxides, examples of which include, but are not limited to, calcium oxide (CaO), magnesium oxide (MgO), metal oxides of zinc, magnesium, iron, aluminum powders, or combinations of these. In embodiments, the expansion additive may be a calcined magnesium oxide. In embodiments, the expansion additive may be a mixture of calcium oxide and magnesium oxide. The cement composition, accelerated cement composition, or both, may include less than or equal to 10% BWOC expansion additive or less than or equal to 5% BWOC expansion additive. The cement composition, accelerated cement composition, or both, may include from 0.0% BWOC to 10% BWOC, from 0.0% BWOC to 5% BWOC, from 0.1% BWOC to 10% BWOC, from 0.1% BWOC to 5% BWOC, or from 1% BWOC to 10% BWOC expansion additive. In embodiments, the cement composition, accelerated cement composition, or both, may not include expansion additives or may be substantially free of expansion additives, such as less than 1% BWOC, less than 0.1% BWOC, or even less than 0.01% BWOC expansion additive.

During curing, hydration of magnesium oxide to magnesium hydroxide may provide an expansive force within the cement matrix. Diameters of tubular strings, such casings and liners, may be affected by changes in temperature and pressure, and therefore, the diameters of such tubular strings may be reduced or expanded, which can lead to the formation of a microannulus. The expansion additive may be used in the cement composition to maintain a seal around the tubular string and against the wellbore wall of the wellbore to achieve superior bonding.

The cement compositions may include a dispersant containing one or more anionic groups. The dispersant may include synthetic sulfonated polymers, lignosulfonates with carboxylate groups, hydroxylated sugars, other anionic groups, or combinations of any of these. The cement composition, accelerated cement composition, or both, may include from 0.0% BWOC to 10% BWOC dispersant. In embodiments, the cement composition, accelerated cement composition, or both, may not include a dispersant or may be substantially free of dispersants, such as having less than 1% BWOC, less than 0.1% BWOC, or even less than 0.01% BWOC dispersant.

The cement compositions may include a fluid loss additive. The fluid loss additive may include non-ionic cellulose derivatives, such as, but not limited to, hydroxyethylcellulose (HEC). Alternatively or additionally, the fluid loss additive may be a non-ionic synthetic polymer, such as but not limited to, polyvinyl alcohol or polyethyleneimine. The fluid loss additive may also include one or more anionic synthetic polymers, such as, but not limited to, 2-acrylamido-2-methylpropane sulfonic acid (AMPS) or AMPS-copolymers, including lattices of AMPS-copolymers. The fluid loss additive may include bentonite. The fluid loss additive may include an acrylamide copolymer, an aliphatic amide polymer, an acrylic polymer, bentonite, latex polymers, gilsonite, additives to latex (for example, styrene-butadiene latex in combination with nonionic and anionic surfactants), octylphenol ethoxylate, polyethylene oxide, copolymers of maleic anhydride, 2-hydroxypropyl acrylate, or combinations of these. The cement composition, accelerated cement composition, or both, may include less than or equal to 5% BWOC, less than or equal to 1% BWOC, or even less than or equal to 0.5% BWOC fluid loss additive. The cement composition, accelerated cement composition, or both, may include from 0.001% BWOC to 5% BWOC, from 0.001% BWOC to 1% BWOC, from 0.001% BWOC to 0.5% BWOC, or from 0.001% BWOC to 0.01% BWOC fluid loss additive. In embodiments, the cement composition, the accelerated cement composition, or both, may not include a fluid loss additive.

The cement composition may include a friction reducer. The friction reducer may be a sulfonic acid salt or an aromatic polymer derivative. Other cement friction reducers may include, but are not limited to, polyoxyethylene sulfonate, acetone formaldehyde cyanide resins, polyoxethylated octylphenol, copolymers of maleic anhydride and 2-hydroxypropyl acrylate, allyloxybenzene sulfonate, allyloxybenzene phosphonate, ferrous lignosulfonate, ferrous sulfate, tannic acid, alkali lignosulfonate, acetone polycondensate, formaldehyde polycondensate, sulfonated naphthalene formaldehyde condensate, sulfonated indene resins and sulfonated indene-cumarone resins, melamine sulfonate polymers, vinyl sulfonate polymers, styrene sulfonate polymers, polyethyleneimine phosphonate, casein polysaccharides, or combinations of these. The cement composition, accelerated cement composition, or both, may include less than or equal to 10% BWOC friction reducer, such as less than or equal to 5% BWOC, less than or equal to 1% BWOC, or even less than or equal to 0.5% BWOC friction reducer. The cement composition, accelerated cement composition, or both, may include from 0.0% BWOC to 10% BWOC, from 0.0% BWOC to 5% BWOC, from 0.0% BWOC to 1% BWOC, from 0.0% BWOC to 0.5% BWOC, from 0.001% BWOC to 10% BWOC, from 0.001% BWOC to 5% BWOC, from 0.001% BWOC to 1% BWOC, or from 0.001% BWOC to 0.5% BWOC friction reducer. In embodiments, the cement composition, the accelerated cement composition, or both, may not include a friction reducer.

The cement composition may include a gas block stabilizer. Gas block stabilizers may include, but are not limited to, an aminated aromatic salt, an alkyl ether sulfate, an aminated aromatic polymer, or combinations of these. The cement composition, accelerated cement composition, or both, may comprise less than 10 gallons per sack of cement (gps), less than or equal to 5 gps, or even less than or equal to 1 gps gas block stabilizer. The cement composition, accelerated cement composition, or both, may include from 0.0 gps to 10 gps, from 0.0 gps to 5 gps, from 0.0 gps to 1 gps, from 0.1 gps to 10 gps, from 0.1 gps to 5 gps, from 0.1 gps to 1 gps, from 1 gps to 10 gps, or from 1 gps to 5 gps of gas block stabilizer. In embodiments, the cement composition, the accelerated cement composition, or both, may not include a gas block stabilizer.

As previously discussed, the accelerant composition may be included in the accelerated cement composition. The accelerant composition may increase or accelerate the curing rate of the accelerated cement composition, which may reduce the cure time of the accelerated cement composition to form a hardened cement. The presence of the accelerant composition may enable the accelerated cement composition to have a sufficiently short cure time, such as a cure time of less than 8 hours, less than or equal to 6 hours, less than or equal to 4 hours, less than or equal to 3 hours, or even less than or equal to 2 hours. Thus, the accelerated cement composition of the present disclosure may have a reduced cure time while reducing the corrosion in tubular strings.

As previously discussed, the accelerant composition may include an accelerator compound. Examples of accelerator compounds may include triethanolamine (TEA), aluminum sulphate, or combinations of these. In embodiments, the accelerant composition may include triethanolamine. Being an amine, the triethanolamine can interact with metal ions, such as iron III ions ($Fe^{3+}$), aluminum ions ($Al^{3+}$), calcium ions ($CA^{2+}$), or combinations of these, in the pore solution of the hydrated cement composition to chelate the metal ions. Chelation of the iron ions, aluminum ions, or both by the triethanolamine may accelerate C3A hydration of the cement composition. The triethanolamine may also chelate the calcium ions, which may change the morphology of the portlandite in the Portland cement. The chelation of metal ions by triethanolamine may be based on complexation reactions in which the triethanolamine acts as an electron pair donor. Through chelation of metal ions in the accelerated cement composition, the triethanolamine may increase the curing rate of the accelerated cement composition.

The triethanolamine may further provide anti-corrosive properties to the accelerated cement composition. The triethanolamine of the accelerant composition may react with the metal at the surface of tubular strings or other metal components of the wellbore to form a protective layer on the surface of the metal. The protective layer formed by reaction of the triethanolamine with the metal surface may reduce or prevent dissolution of iron or other metals from the surface of the tubular string or other metal component to reduce corrosion. Thus, incorporating triethanolamine into the accelerant composition can both increase the curing rate of the accelerated cement composition and reduce corrosion rates of metal components of the wellbore.

The accelerant composition may include from 5 wt. % to 100 wt. % triethanolamine based on the total weight of the accelerant composition. In embodiments, the accelerant composition may include from 5 wt. % to 90 wt. %, from 5 wt. % to 70 wt. %, from 5 wt. % to 50 wt. % from 5 wt. % to 30 wt. %, from 10 wt. % to 100 wt. %, from 10 wt. % to 90 wt. %, from 10 wt. % to 70 wt. %, from 10 wt. % to 50 wt. %, from 10 wt. % to 30 wt. %, from 30 wt. % to 100 wt. %, from 30 wt. % to 90 wt. %, from 30 wt. % to 70 wt. %, from 30 wt. % to 50 wt. %, from 50 wt. % to 100 wt. %, from 50 wt. % to 90 wt. %, from 50 wt. % to 70 wt. %, from 70 wt. % to 100 wt. %, from 70 wt. % to 90 wt. %, or from 90 wt. % to 100 wt. % triethanolamine based on the total weight of the accelerant composition.

The accelerated cement composition may have an amount of the accelerant composition sufficient to provide an amount of triethanolamine in the accelerated cement composition of from 0.1% to 60% BWOC. The amount of triethanolamine in the accelerated cement composition may be from 0.1% BWOC to 60% BWOC, from 0.1% BWOC to 55% BWOC, from 0.1% BWOC to 50% BWOC, from 1% BWOC to 60% BWOC, from 1% BWOC to 55% BWOC, from 1% BWOC to 50% BWOC, from 2% BWOC to 60% BWOC, from 2% BWOC to 55% BWOC, from 2% BWOC to 50% BWOC, from 3% BWOC to 60% BWOC, from 3% BWOC to 55% BWOC, or from 3% BWOC to 50% BWOC. The accelerated cement composition may include an amount of the accelerant composition sufficient so that the accelerated cement composition has a concentration of triethanolamine greater than or equal to 10,000 parts per million by weight (ppmw), such as greater than or equal to 15,000 ppmw, or even greater than or equal to 20,000 ppmw based on the total weight of the accelerated cement composition. When the concentration of triethanolamine in the accelerated cement composition is less than about 10,000 ppmw, the triethanolamine may have a retarding effect on the curing rate of the accelerated cement composition.

The accelerant composition may include aluminum sulphate. Aluminum sulphate may be included in the accelerant composition to provide an additional increase in curing rate of the accelerated cement composition to reduce the cure time of the accelerated cement composition. Additionally, the aluminum sulphate may increase the drying shrinkage and improve early strength development in the accelerated cement composition. However, aluminum sulphate may reduce the fluidity of the accelerated cement composition and may weaken the late strength of the cured cement. The aluminum sulphate may not provide anti-corrosive properties as are provided by the triethanolamine. When the accelerant composition includes aluminum sulphate in addition to the TEA, the accelerant composition may include from 10 wt. % to 30 wt. %, from 15 wt. % to 30 wt. %, from 20 wt. % to 30 wt. %, from 10 wt. % to 25 wt. %, from 15 wt. % to 25 wt. %, or from 10 wt. % to 20 wt. % aluminum sulphate based on the total weight of the accelerant composition.

In embodiments, the accelerant composition may include from 5 wt. % to 10 wt. % triethanolamine based on the total weight of the accelerant composition, and from 10 wt. % to 30 wt. % aluminum sulphate based on the total weight of the accelerant composition. In embodiments, the accelerant composition may not include aluminum sulphate or may be substantially free of aluminum sulphate. The accelerant composition may have less than 0.1 wt. % aluminum sulphate based on the total weight of the accelerant composition.

In embodiments, the accelerant composition may consist or consist essentially of triethanolamine and, optionally, water. The water in the accelerant composition may include distilled water, deionized water, filtered water, or tap water. The water may include freshwater or seawater, natural or synthetic brine, salt water, municipal water, well water, formation water, produced water, brackish water, or combinations of these.

As previously discussed, the cement composition may be included in the accelerated cement composition. The cement composition may include from 10 wt. % to 70 wt. % cement precursor based on the total weight of the cement composition; and from 5 wt. % to 70 wt. % water based on the total weight of the cement composition. In embodiments, the cement precursor may be API Class G cement. In embodiments, the cement precursor may include metal oxide. The metal oxide may include aluminum oxide, iron oxide, calcium oxide, magnesium oxide, or combinations thereof. The cement composition may include from 10 wt. % to 150 wt. % weighting agent based on the total weight of the cement composition. The weighting agent may include hematite, hausmanite, or both. The cement composition may have a density in a range of from 65 pcf to 180 pcf.

As previously discussed, the accelerant composition may be included in the accelerated cement composition. The accelerant composition may include triethanolamine. In embodiments, a weight ratio of triethanolamine to the cement precursor may be from 0.1% to 60%. In embodiments, the accelerant composition may further include an aluminum sulphate. In embodiments, the accelerant composition may include from 5 wt. % to 10 wt. % triethanolamine based on the total weight of the accelerant composition; and from 10 wt. % to 30 wt. % aluminum sulphate based on the total weight of the accelerant composition. In embodiments, the accelerant composition may not include aluminum sulphate or may be substantially free of aluminum sulphate. In some embodiments, the accelerant composition may not include calcium chloride ($CaCl_2$) or may be substantially free of calcium chloride, such as having less than 0.1 wt. %, less than 0.01 wt. %, or even less than 0.001 wt. % calcium chloride based on the weight of the accelerant composition. In embodiments, the accelerant composition may consist of triethanolamine and water.

The accelerated cement composition may be produced by preparing the cement composition, preparing the accelerant composition, and then adding the accelerant composition to the cement composition. The cement composition may be prepared separately from the accelerant composition and the accelerant composition added to the cement composition to produce the accelerated cement composition just before use of the accelerated cement composition. For example, the cement composition may be prepared in a first vessel and the accelerant composition may be prepared in a second vessel separate from the first vessel. After adding the accelerant composition to the cement composition to produce the accelerated cement composition, the accelerated cement composition may be mixed for a period of time sufficient to produce a homogeneous mixture. In some embodiments, the cement composition may be mixed for a period of from 10 minutes to 50 minutes, or about 30 minutes. Following mixing, the accelerated cement composition may be pumped or injected into the top opening of the wellbore annulus, casing-casing annulus, or both, and allowed to cure to complete cementing of the tubular string.

The cement composition may be produced by preparing the cement precursor, preparing the water, and then adding the water to the cement precursor. The cement precursor may be prepared separately from the water and the water added to the cement precursor to produce the cement composition just before use of the cement composition. After adding the water to the cement precursor to produce the cement composition, the cement composition may be mixed for a period of time sufficient to produce a homogeneous mixture. In some embodiments, the cement composition may be mixed for a period of from 10 minutes to 50 minutes, or about 30 minutes. Following mixing, the accelerant composition may be added to the cement composition to form the accelerated cement composition just before use.

The cement composition may include from 0.1 wt. % to 99 wt. % cement precursor based on the total weight of the cement composition. In other embodiments, the cement composition may include from 0.1 wt. % to 95 wt. %, from 0.1 wt. % to 90 wt. %, from 0.1 wt. % to 75 wt. %, from 0.1 to 50 wt. %, from 0.1 wt. % to 25 wt. %, from 0.1 wt. % to 10 wt. %, from 1 wt. % to 99 wt. %, from 1 wt. % to 95 wt. %, from 1 wt. % to 90 wt. %, from 1 wt. % to 75 wt. %, from 1 wt. % to 50 wt. %, from 10 wt. % to 99 wt. %, from 10 wt. % to 95 wt. %, from 10 wt. % to 90 wt. %, from 10 wt. % to 75 wt. %, from 10 wt. % to 50 wt. %, from 25 wt. % to 99 wt. %, from 25 wt. % to 95 wt. %, from 25 wt. % to 90 wt. %, from 25 wt. % to 75 wt. %, from 50 wt. % to 99 wt. %, from 50 wt. % to 95 wt. %, from 50 wt. % to 90 wt. %, or from 50 wt. % to 75 wt. % cement precursor based on the total weight of the cement composition.

As discussed subsequently in this disclosure, the accelerated cement compositions can be prepared with different density, viscosity, and mechanical properties by changing the concentrations of the accelerant composition in the accelerated cement composition or by changing the amounts of weighting materials or other additives. For example, the accelerated cement compositions can be formulated to produce the cured cement composition that is solid or viscous, as needed. Thus, the accelerated cement composition may be adapted for use in different downhole conditions of the wellbore. In embodiments, the accelerated cement compositions with the accelerant composition may be formulated to have reduced viscosity compared to wellbore cements that do not include the accelerant composition. In embodiments, the accelerated cement compositions with the accelerant composition may be formulated to have greater viscosity compared to wellbore cements that do not include the accelerant composition. In embodiments, the yield point of the accelerated cement compositions with the accelerant composition may be from 10 pounds per square foot ($lb/ft^2$) to 40 $lb/ft^2$ as measured according to methods provided subsequently in the present disclosure. The accelerated cement compositions of the present application may be adjusted to modify the rheology, density, and compressive strength of the accelerated cement composition, which may reduce or prevent the well integrity from being compromised during the well's lifetime.

The cement composition may have a density of from 65 pcf to 180 pcf, which is measured prior to adding the accelerant composition to the cement composition. In embodiments, the cement composition, prior to adding the accelerant composition, may have a density of from 65 pcf to 160 pcf, from 65 pcf to 140 pcf, from 65 pcf to 125 pcf, from 120 pcf to 180 pcf, from 120 pcf to 160 pcf, from 120 pcf to 140 pcf, from 125 pcf to 180 pcf, from 125 pcf to 160 pcf, from 125 pcf to 140 pcf, from 140 pcf to 180 pcf, from 140 pcf to 160 pcf, or from 160 pcf to 180 pcf.

In embodiments, the accelerated cement composition may have a Bearden consistency (BC) of from 10 to 100 BC when measured using a high temperature high pressure (HTHP) consistometer according to the test methods provided subsequently in this disclosure. In measuring the Bearden consistency, the temperature of accelerated cement composition is increased to a temperature of 80° C. to simulate a bottom hole circulating temperature (BHCT) of 80° C., and the pressure of accelerated cement composition may be ramped up to a final pressure of 200 pounds per square inch (psi) (1378 kPa). The accelerated cement composition may have a BC of from 10 BC to 100 BC, from 10 BC to 90 BC, from 10 BC to 80 BC, from 10 BC to 70 BC, from 30 BC to 100 BC, from 30 BC to 90 BC, from 30 BC to 80 BC, from 30 BC to 70 BC, from 50 BC to 100 BC, from 50 BC to 90 BC, from 50 BC to 80 BC, from 50 BC to 70 BC, from 60 BC to 100 BC, from 60 BC to 90 BC, from 60 BC to 80 BC, of from 60 BC to 70 BC when measured using the HTHP consistometer according to the test methods provided subsequently in this disclosure.

Before any substantial curing of the cement has taken place (such as within less than 20 minutes after combining the accelerant composition with the cement composition to produce the accelerated cement composition), the accelerated cement composition may have a plastic viscosity (PV) of from 1 centipoise (cP) to 200 cP when measured at a temperature from 70° F. to 300° F. (21° C. to 149° C.) according to the test methods provided subsequently in this disclosure. The accelerated cement composition may have a PV of from 1 cP to 150 cP, from 1 cP to 100 cP, from 1 cP to 50 cP, from 10 cP to 200 cP, from 10 cP to 150 cP, from 10 cP to 100 cP, from 10 cP to 50 cP, from 20 cP to 200 cP, from 20 cP to 150 cP, from 20 cP to 100 cP, or from 20 cP to 50 cP when measured at temperatures from 70° F. to 300° F. (21° C. to 149° C.) according to the test methods provided subsequently in this disclosure.

Before any substantial curing of the cement has taken place, the accelerated cement composition may have a yield point (YP) of 1 to about 200 when measured at about 70° F. to about 300° F. (about 21° C. to about 149° C.) according to the test methods provided subsequently in this disclosure. The accelerated cement composition may have a YP of from about 1 to about 150, from about 1 to about 100, about 1 to about 50, about 50 to about 200, about 50 to about 150, about 50 to about 100, about 100 to about 200, about 100 to about 150, about 140 to about 200, or about 150 to about 200 when measured at about 70° F. to about 300° F. (about 21° C. to about 149° C.) according to the test methods provided subsequently in this disclosure. Before any substantial curing has taken place, the accelerated cement composition may have a fluid loss of from 0 to 400 cubic centimeters per 30 minutes ($cm^3$/30 min) measured according to the test methods provided subsequently in this disclosure.

In embodiments, prior to curing the accelerated cement composition, the free fluid of the accelerated cement composition is less than or equal to 10%, less than or equal to 5%, less than or equal to 3%, less than or equal to 2%, less than or equal to 1%, or even less than or equal to 0.1% measured according to the test methods provided subsequently in this disclosure. For example, in embodiments, prior to curing the accelerated cement composition, the free fluid of the accelerated cement composition is about 0%.

The accelerated cement composition may have a thickening time of from 0.1 hours to 12 hours according to the test methods provided subsequently in this disclosure. In embodiments, the accelerated cement composition may have a thickening time of from 0.1 hours to 12 hours, from 0.1 hours to 6 hours, from 0.1 hours to 4 hours, from 0.1 hours to 3 hours, from 0.1 hour to 2 hours, from 0.5 hours to 12 hours, from 0.5 hours to 6 hours, from 0.5 hours to 4 hours, from 0.5 hours to 3 hours, or from 0.5 hours to 2 hours.

In embodiments, the accelerated cement composition may have a cure time of from 0.1 hours to 12 hours according to the test methods provided subsequently in this disclosure. In some embodiments, the accelerated cement composition may have a thickening time of from 0.1 hours to 12 hours, from 0.1 hours to 6 hours, from 0.1 hours to 4 hours, from 0.1 hours to 3 hours, from 0.1 hour to 2 hours, from 0.5 hours to 12 hours, from 0.5 hours to 6 hours, from 0.5 hours to 4 hours, from 0.5 hours to 3 hours, or from 0.5 hours to 2 hours.

Test Methods

Viscosity

The viscosity of the cement compositions or accelerated cement compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet ($lbf/100\ ft^2$). The viscometer may also be used to measure the shear rate of the cement compositions or accelerated cement compositions.

Rheology

The rheology of the cement compositions or accelerated cement compositions may be modeled based on Bingham plastic flow behavior. In particular, the cement compositions or accelerated cement compositions may behave as a rigid body at lesser shear stress but flow as a viscous fluid at greater shear stress. The rheological behavior of the cement compositions or accelerated cement compositions may be determined by measuring the shear stress on the composition at different shear rates, which may be accomplished by measuring the shear stress, the shear rate, or both, on the composition using a FANN® Model 35 viscometer operated at 3 rpm, 6 rpm, 100 rpm, 200 rpm, 300 rpm, or 600 rpm, for example. The rheology of the cement compositions or accelerated cement compositions may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the cement compositions or accelerated cement compositions, and a lesser PV is preferred. The PV of the cement compositions or accelerated cement compositions may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the cement compositions or accelerated cement compositions are provided in this disclosure in units of centipoise (cP).

$$PV=(\text{viscosity at 600 rpm})-(\text{viscosity at 300 rpm}) \qquad \text{EQU. 3}$$

At shear stress less than the YP of the cement composition, the cement composition behaves as a rigid body, and at shear stress greater than the YP of the cement composition, the cement composition flows as a viscous fluid. In other words, the YP represents the amount of stress required to move a fluid from a static condition. The YP is determined by extrapolating the Bingham plastic rheology model to a shear rate of zero. The YP of the cement composition may be estimated from the PV from EQU. 3 by subtracting the PV from the shear stress measured at 300 rpm according to Equation 4 (EQU. 4), which is provided subsequently.

$$YP=(300 \text{ rpm reading})-PV \qquad \text{EQU. 4}$$

The YP is expressed as a force per area, such as pounds of force per one hundred square feet ($lbf/100\ ft^2$) for example. The methods for measuring and determining PV and YP for the cement compositions or accelerated cement compositions are consistent with methods conventionally used for drilling fluids in general.

Fluid Loss Test

API fluid loss is a test that measures the static filtration behavior of the cement composition or the accelerated cement composition at ambient temperature and 100-psi differential pressure. The fluid loss of the cement compositions or the accelerated cement composition may be measured according to test methods provided in the API Recommended Practice For Cementing (RP 10B).

Free Fluid API Test

Free fluid, which is also known as "free water," is the percent volume of fluid that separates from the cement composition or the accelerated cement composition when the slurry is left static. The free fluid can be measured according to test methods provided in the API Recommended Practice For Cementing (RP 10B).

Thickening Time Test

Thickening time is a measurement of the time the cement composition or the accelerated cement composition remains in a fluid state and is capable of being pumped. To assess thickening time, downhole conditions are simulated by plotting the consistency of the slurry over time at the anticipated temperature and pressure conditions. The consistency of the slurry is measured in Bearden Consistency units (Bc), which are a dimensionless quantity on a scale from 1 to 100. At levels greater than 50 Bc, pumping begins to become difficult, and at 100 Bc, the cement composition or the accelerated cement composition is completely set.

EXAMPLES

The following examples illustrate one or more features of the present disclosure. It should be understood that these examples are not intended to limit the scope of the disclosure or the appended claims in any manner.

In these Examples and Comparative Examples, Table 1 is subsequently included in this disclosure and provides the composition for class G cement utilized in the accelerated cement compositions in these Examples and cement compositions of the Comparative Examples. Table 2 provides the compositions of the accelerant compositions used in Examples 1 through 3.

TABLE 1

Composition of Class G Cement

| Constituent | Mass % |
|---|---|
| Silica ($SiO_2$) | 21 |
| Alumina ($Al_2O_3$) | 3.5 |
| Iron Oxide ($Fe_2O_3$) | 3.9 |
| Calcium Oxide, Total (TCaO) | 62.3 |
| Magnesium Oxide (MgO) | 4.4 |
| Sulphur Trioxide ($SO_3$) | 2.8 |
| Loss on Ignition | 1 |
| Equivalent Alkali (as $Na_2O$) | 0.54 |

TABLE 2

Accelerant Compositions in Examples 1-3

| Constituent | Units | Accelerant Comp. 1 | Accelerant Comp. 2 |
|---|---|---|---|
| Aluminum sulphate | Weight percent | 10-30 | — |
| Triethanolamine (TEA) | Weight percent | 5-10 | 100 |
| Water | Weight percent | balance | — |

The Accelerated cement compositions of Examples 1-3, the cement composition of Comparative Example 1, the cement composition with $CaCl_2$ of Comparative Example 2, and the cement composition with TEA of Comparative Example 3 are provided in Table 3 subsequently provided in this disclosure.

TABLE 3

Cement and Accelerant compositions for Examples 1-3 and Comparative Examples 4-6

| | Example 1 | Example 2 | Example 3 | Comparative Example 4 | Comparative Example 5 | Comparative Example 6 |
|---|---|---|---|---|---|---|
| Water | 360 g | 360 g | 360 g | 340 g | 360 g | 360 g |
| Cement | 800 g | 800 g | 800 g | 800 g | 800 g | 800 g |
| Accelerant Composition 1 | 51.2 g | 33 g | — | — | — | — |
| Accelerant Composition 2 | — | — | 32 g | — | — | 3.2 g |
| $CaCl_2$ | — | — | — | — | 32 g | — |

Thickening Time Test for a Cement Composition with an Accelerant Composition

For the accelerated cement composition of Examples 1-3 and the cement compositions of Comparative Examples 4-6, a thickening time test for the accelerated cement composition according to the present disclosure was performed. The cement composition and accelerant composition were contacted and mixed for 5 minutes to produce the accelerated cement composition of Examples 1-3.

The thickening time test was conducted under conditions simulating downhole temperature and pressure conditions using a high temperature high pressure (HTHP) consistometer obtained from Chandler Engineering. The accelerated cement composition of Examples 1-3 were introduced to the HTHP consistometer, and the temperature and pressure of the accelerated cement composition was gradually increased over a period of 30 minutes. The temperature of the accelerated cement composition was increased to a temperature of 196 degrees Fahrenheit (° F.) (91° C.) to simulate a bottom hole circulating temperature (BHCT) of 91° C., and the pressure was ramped up to a final pressure of 8000 pounds per square inch (psi) (55,158 kPa). The thickening time and Final Bearden consistency for each of the accelerated cement compositions of Examples 1-3 were measured using the HTHP consistometer and the results are in Table 4, which is provided subsequently in this disclosure.

TABLE 4

Thickening Time and Bearden Consistency of the accelerated cement compositions
of Examples 1-3 and cement compositions of Comparative Examples 4-6

|  | Example 1 | Example 2 | Example 3 | Comparative Example 4 | Comparative Example 5 | Comparative Example 6 |
|---|---|---|---|---|---|---|
| Mixing Duration (minutes) | 5 | 5 | 5 | 7 | 5 | 5 |
| Thickening Time (hours:minutes) | 0:05 | 1:30 | 0:28 | 5:00 | 1:50 | 5:25 |
| Final Bearden Consistency (Bc) | 100 | 82 | 100 | 41 | 24 | 100 |

As shown in Table 4, the accelerated cement compositions of Examples 1-3 all exhibited a Final Bearden Consistency greater than the Final Bearden Consistency of Comparative Example 4 with no accelerant and Comparative Example 5 with $CaCl_2$ as the accelerant. The accelerated cement composition of Examples 3 with an accelerant composition comprising 100% triethanolamine exhibited a Final Bearden Consistency of 100, indicating that using triethanolamine by itself as the accelerant composition produces an accelerated cement composition having cure rates sufficiently short to be able to treat and seal a wellbore annulus in the event that primary cementing fractured the formation at the wellbore wall. As shown by Example 3, it is possible to reduce the cure time of the accelerated cement composition to less than 30 minutes with an accelerant composition that includes only the triethanolamine and no other accelerants.

A first aspect of the present disclosure may be directed to a method of reducing corrosion in tubular strings installed in wellbores. The method may include dispensing an accelerated cement composition into a wellbore annulus, a casing-casing annulus, or both, where the accelerated cement composition may include a cement composition and an accelerant composition. The cement composition may include a cement precursor and water, and the accelerant composition may include triethanolamine. A concentration of the triethanolamine in the accelerated cement composition may be greater than or equal to 10,000 parts per million by weight. The method may further include allowing the accelerated cement composition to cure in the annulus to form a cured cement, where the triethanolamine may react with a metal of the tubular string, the reaction forming a protective layer on the surfaces of the tubular string that may inhibit dissolution of iron from the metal of the tubular string.

A second aspect of the present disclosure may include the first aspect, further comprising preparing the cement composition and adding the accelerant composition to the cement composition to produce the accelerated cement composition.

A third aspect of the present disclosure may include either one of the first or second aspects, further comprising placing the tubular string in the wellbore.

A fourth aspect of the present disclosure may include any one of the first through third aspects, where dispensing the accelerated cement composition into the annulus may comprise pumping the accelerated cement composition directly into a top opening of the wellbore annulus or casing-casing annulus so that the accelerated cement composition can flow downward into the wellbore annulus, the casing-casing annulus, or both.

A fifth aspect of the present disclosure may include any one of the first through fourth aspects, in which the cement composition comprises at least from 10 weight percent (wt. %) to 70 wt. % cement precursor based on the total weight of the cement composition and from 5 wt. % to 70 wt. % water based on the total weight of the cement composition, and the accelerated cement composition may comprise from 0.1 percent (%) to 60% by weight of cement triethanolamine.

A sixth aspect of the present disclosure may include any one of the first through fifth aspects, in which the accelerated cement composition may have a cure time of from 0.1 hours to 12 hours.

A seventh aspect of the present disclosure may include any one of the first through sixth aspects, in which the accelerant composition may further includes an aluminum sulphate.

An eighth aspect of the present disclosure may include the seventh aspect, in which the accelerant composition includes from 5 wt. % to 10 wt. % triethanolamine based on the total weight of the accelerant composition and from 10 wt. % to 30 wt. % aluminum sulphate based on the total weight of the accelerant composition.

A ninth aspect of the present disclosure may include any one of the first through sixth aspects, in which the accelerant composition may be substantially free of aluminum sulphate.

A tenth aspect of the present disclosure may include any one of the first through ninth aspects, in which the accelerant composition may be substantially free of calcium chloride.

An eleventh aspect of the present disclosure may include any one of the first through ninth aspects, in which the accelerant composition may comprise less than 0.01% by weight of cement calcium chloride.

A twelfth aspect of the present disclosure may include any one of the first through eleventh aspects, in which the accelerant composition consists or consists essentially of triethanolamine and, optionally, water.

A thirteenth aspect of the present disclosure may include any one of the first through twelfth aspects, in which the cement precursor may be API Class G cement.

A fourteenth aspect of the present disclosure may include any one of the first through thirteenth aspects, in which the cement precursor may include one or a plurality of metal oxides that includes aluminum oxide, iron oxide, calcium oxide, magnesium oxide, or combinations thereof.

A fifteenth aspect of the present disclosure may include any one of the first through fourteenth aspects, in which the cement composition may include from 10% to 150% by weight of cement weighting agent.

A sixteenth aspect of the present disclosure may include the fifteenth aspect, in which the weighting agent may comprise hematite, hausmanite, or both.

A seventeenth aspect of the present disclosure may include any one of the first through sixteenth aspects, in which the cement composition may have a density in a range of from 65 pcf to 180 pcf.

An eighteenth aspect of the present disclosure may be directed to a method for reducing corrosion in tubular strings installed in wellbores. The method may include injecting a cement composition into a wellbore annulus, a casing-casing annulus, or both, for primary cementing, where primary cementing may result in incomplete cementing of the wellbore annulus, the casing-casing annulus, or both. The method may further include injecting an accelerated cement composition into a top opening of the wellbore annulus, the casing-casing annulus, or both, the accelerated cement composition comprising the cement composition and an accelerant composition. The cement composition may comprise a cement precursor and water, and the accelerant composition may comprise triethanolamine. A concentration of the triethanolamine in the accelerated cement composition may be greater than or equal to 10,000 parts per million by weight. The method may further include allowing the accelerated cement composition to cure in the annulus to form a cured cement, where the triethanolamine may react with a metal of the tubular string, the reaction forming a protective layer on the surfaces of the tubular string that may inhibit dissolution of iron from the metal of the tubular string.

A nineteenth aspect of the present disclosure may include the eighteenth aspect, further comprising preparing the cement composition and adding the accelerant composition to the cement composition to produce the accelerated cement composition.

A twentieth aspect of the present disclosure may include either one of the eighteenth or nineteenth aspects, further comprising drilling the wellbore.

A twenty-first aspect of the present disclosure may include any one of the eighteenth through twentieth aspects, further comprising placing the tubular string in the wellbore.

A twenty-second aspect of the present disclosure may include any one of the eighteenth through twenty-first aspects, further comprising pumping a first cement composition into the center of the tubular string.

A twenty-third aspect of the present disclosure may include any one of the eighteenth through twenty-second aspects, further comprising pumping a displacement fluid into the wellbore to force a first cement composition into the wellbore annulus.

A twenty-fourth aspect of the present disclosure may include any one of the eighteenth through twenty-third aspects, further comprising identifying a lost circulation zone encountered during cementing, wherein the lost circulation zone may be characterized by loss of a first cement composition to the lost circulation zone, preventing the first cement composition from filling the entire wellbore annulus.

A twenty-fifth aspect of the present disclosure may include any one of the eighteenth through twenty-fourth aspects, in which dispensing the accelerated cement composition into the annulus may comprise pumping the accelerated cement composition directly into a top opening of the wellbore annulus or casing-casing annulus so that the accelerated cement composition may flow downward into the wellbore annulus, the casing-casing annulus, or both.

A twenty-sixth aspect of the present disclosure may include any one of the eighteenth through twenty-fifth aspects, in which the cement composition may comprises at least from 10 weight percent (wt. %) to 70 wt. % cement precursor based on the total weight of the cement composition and from 5 wt. % to 70 wt. % water based on the total weight of the cement composition, and the accelerated cement composition may comprise from 0.1 percent (%) to 60% by weight of cement triethanolamine.

A twenty-seventh aspect of the present disclosure may include any one of the eighteenth through twenty-sixth aspects, in which the accelerated cement composition may have a cure time of from 0.1 hours to 12 hours.

A twenty-eighth aspect of the present disclosure may include any one of the eighteenth through twenty-seventh aspects, in which the accelerant composition may further include aluminum sulphate.

A twenty-ninth aspect of the present disclosure may include the twenty-eighth aspect, in which the accelerant composition may include from 5 wt. % to 10 wt. % triethanolamine based on the total weight of the accelerant composition and from 10 wt. % to 30 wt. % aluminum sulphate based on the total weight of the accelerant composition.

A thirtieth aspect of the present disclosure may include any one of the eighteenth through twenty-eighth aspects, in which the accelerant composition may be substantially free of aluminum sulphate.

A thirty-first aspect of the present disclosure may include any one of the eighteenth through thirtieth aspects, in which the accelerant composition may be substantially free of calcium chloride.

A thirty-second aspect of the present disclosure may include any one of the eighteenth through thirtieth aspects, in which the accelerant composition may comprise less than 0.01% by weight of cement calcium chloride.

A thirty-third aspect of the present disclosure may include any one of the eighteenth through thirtieth aspects, in which the accelerant composition consists or consists essentially of triethanolamine and, optionally, water.

A thirty-fourth aspect of the present disclosure may include any one of the eighteenth through thirty-third aspects, in which the cement precursor may be an API Class G cement.

A thirty-fifth aspect of the present disclosure may include any one of the eighteenth through thirty-fourth aspects, in which the cement precursor may include one or a plurality of metal oxides that includes aluminum oxide, iron oxide, calcium oxide, magnesium oxide, or combination thereof.

A thirty-sixth aspect of the present disclosure may include any one of the eighteenth through thirty-fifth aspects, in which the cement composition may include from 10% to 150% by weight of cement weighting agent.

A thirty-seventh aspect of the present disclosure may include the thirty-sixth aspect, in which the weighting agent may comprise hematite, hausmanite, or both.

A thirty-eighth aspect of the present disclosure may include any one of the eighteenth through thirty-seventh aspects, in which the cement composition may have a density in a range of from 65 pcf to 180 pcf.

A thirty-ninth aspect of the present disclosure may be directed to an accelerated cement composition for reducing corrosion of wellbore casings, the accelerated cement composition may include a cement composition comprising from 10 wt. % to 70 wt. % cement precursor based on the total weight of the cement composition and from 5 wt. % to 70 wt. % water based on the total weight of the cement composition. The accelerated cement composition may further include an accelerant composition comprising triethanolamine, where the accelerated cement composition may comprise a concentration of triethanolamine greater than or equal to 10,000 parts per million by weight.

A fortieth aspect of the present disclosure may include the thirty-ninth aspect, in which the accelerated cement composition may comprise from 0.1% to 60% triethanolamine by weight of the cement composition.

A forty-first aspect of the present disclosure may include either one of the thirty-ninth or fortieth aspects, in which the accelerant composition may further comprise an aluminum sulphate.

A forty-second aspect of the present disclosure may include any one of the thirty-ninth through forty-first aspects, in which the accelerant composition may include from 5 wt. % to 10 wt. % triethanolamine based on the total weight of the accelerant composition and from 10 wt. % to 30 wt. % aluminum sulphate based on the total weight of the accelerant composition.

A forty-third aspect of the present disclosure may include either one of the thirty-ninth or fortieth aspects s, in which the accelerant composition may be substantially free of aluminum sulphate.

A forty-fourth aspect of the present disclosure may include either one of the thirty-ninth or fortieth aspects, in which the accelerated cement composition is substantially free of calcium chloride.

A forty-fifth aspect of the present disclosure may include either one of the thirty-ninth or fortieth aspects, in which the accelerated cement composition may comprise less than 0.01% by weight of cement calcium chloride.

A forty-sixth aspect of the present disclosure may include either one of the thirty-ninth or fortieth aspects, in which the accelerant composition consists or consists essentially of triethanolamine and, optionally, water.

A forty-seventh aspect of the present disclosure may include any one of the thirty-ninth through forty-sixth aspects, in which the cement precursor may be an API Class G cement.

A forty-eighth aspect of the present disclosure may include any one of the thirty-ninth through forty-seventh aspects, in which the cement precursor may include one or a plurality of metal oxides that includes one or more of aluminum oxide, iron oxide, calcium oxide, magnesium oxide, or combination thereof.

A forty-ninth aspect of the present disclosure may include any one of the thirty-ninth through forty-eighth aspects, in which the cement composition may include from 10% to 150% by weight of cement weighting agent.

A fiftieth aspect of the present disclosure may include any one of the thirty-ninth through forty-ninth aspects, in which the weighting agent may comprise hematite, hausmanite, or both.

A fifty-first aspect of the present disclosure may include any one of the thirty-ninth through fiftieth aspects, in which the cement composition may have a density in a range of from 65 pcf to 180 pcf.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of" For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. An accelerated cement composition for reducing corrosion of wellbore casings, the accelerated cement composition comprising:
 a cement composition comprising:
  from 10 wt. % to 70 wt. % cement precursor based on the total weight of the cement composition, where the cement precursor is an API Class G cement; and
  from 5 wt. % to 70 wt. % water based on the total weight of the cement composition; and
 an accelerant composition comprising triethanolamine and from 10 wt. % to 30 wt. % aluminum sulphate based on the total weight of the accelerant composition;
 where the accelerated cement composition comprises a concentration of triethanolamine greater than or equal to 10,000 parts per million by weight based on the total weight of the accelerated cement composition.

2. The accelerated cement composition of claim 1, in which the accelerated cement composition comprises from 0.1% to 60% triethanolamine by weight of the cement composition.

3. The accelerated cement composition of claim 1, in which
 triethanolamine is present from 5 wt. % to 10 wt. % based on the total weight of the accelerant composition.

4. The accelerated cement composition of claim 1, in which the cement composition further comprises from 10% BWOC to 150% BWOC weighting agent, where the weighting agent comprises hematite, hausmanite, or both.

5. The accelerated cement composition of claim 1, in which the accelerant composition is substantially free of calcium chloride.

6. The accelerated cement composition of claim 1, in which the accelerant composition comprises less than 0.01% BWOC calcium chloride.

7. The accelerated cement composition of claim 1, in which the cement precursor comprises one or a plurality of metal oxides that includes aluminum oxide, iron oxide, calcium oxide, magnesium oxide, or combinations thereof.

8. The accelerated cement composition of claim 1, in which the cement composition has a density in a range of from 65 pcf to 180 pcf.

9. The accelerated cement composition of claim 1, in which the accelerated cement composition is prepared by mixing the cement composition with the accelerant composition for a period time of from 10 minutes to 50 minutes, where the accelerated cement composition is a homogeneous mixture.

10. The accelerated cement composition of claim 1, in which the accelerated cement composition further comprises from 3% BWOC to 50% BWOC of triethanolamine.

11. The accelerated cement composition of claim 1, in which the accelerant composition comprises from 5 wt. % to 90 wt. % triethanolamine based on a total weight of the accelerant composition.

* * * * *